A. F. BATCHELDER.
LOCOMOTIVE.
APPLICATION FILED APR. 28, 1909.
1,008,579.
Patented Nov. 14, 1911.
3 SHEETS—SHEET 1.
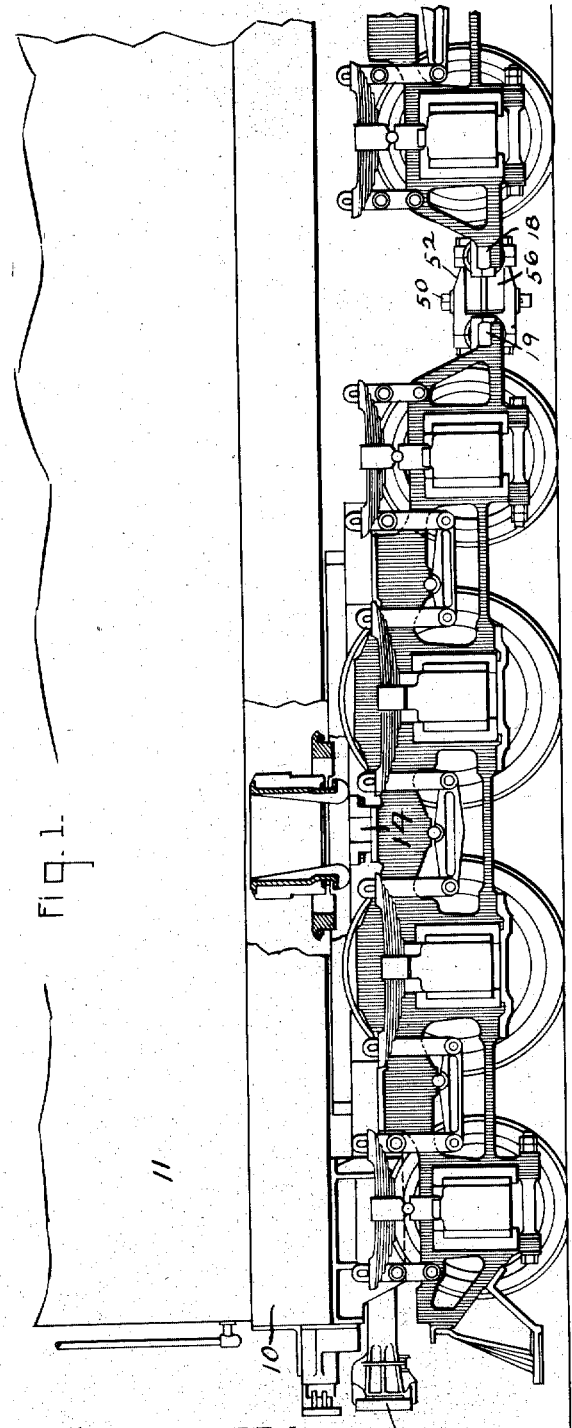
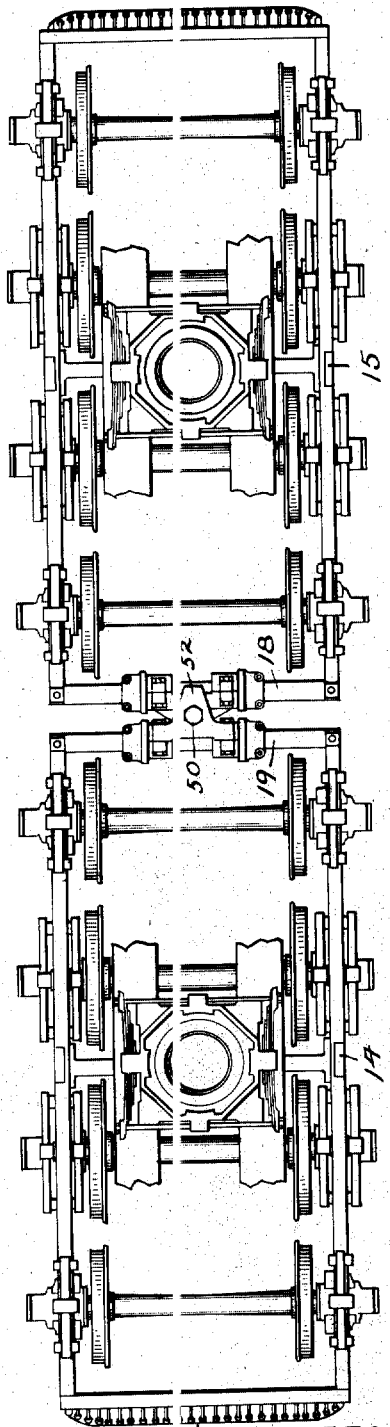
WITNESSES:
INVENTOR:
ASA F. BATCHELDER
BY
ATTY.

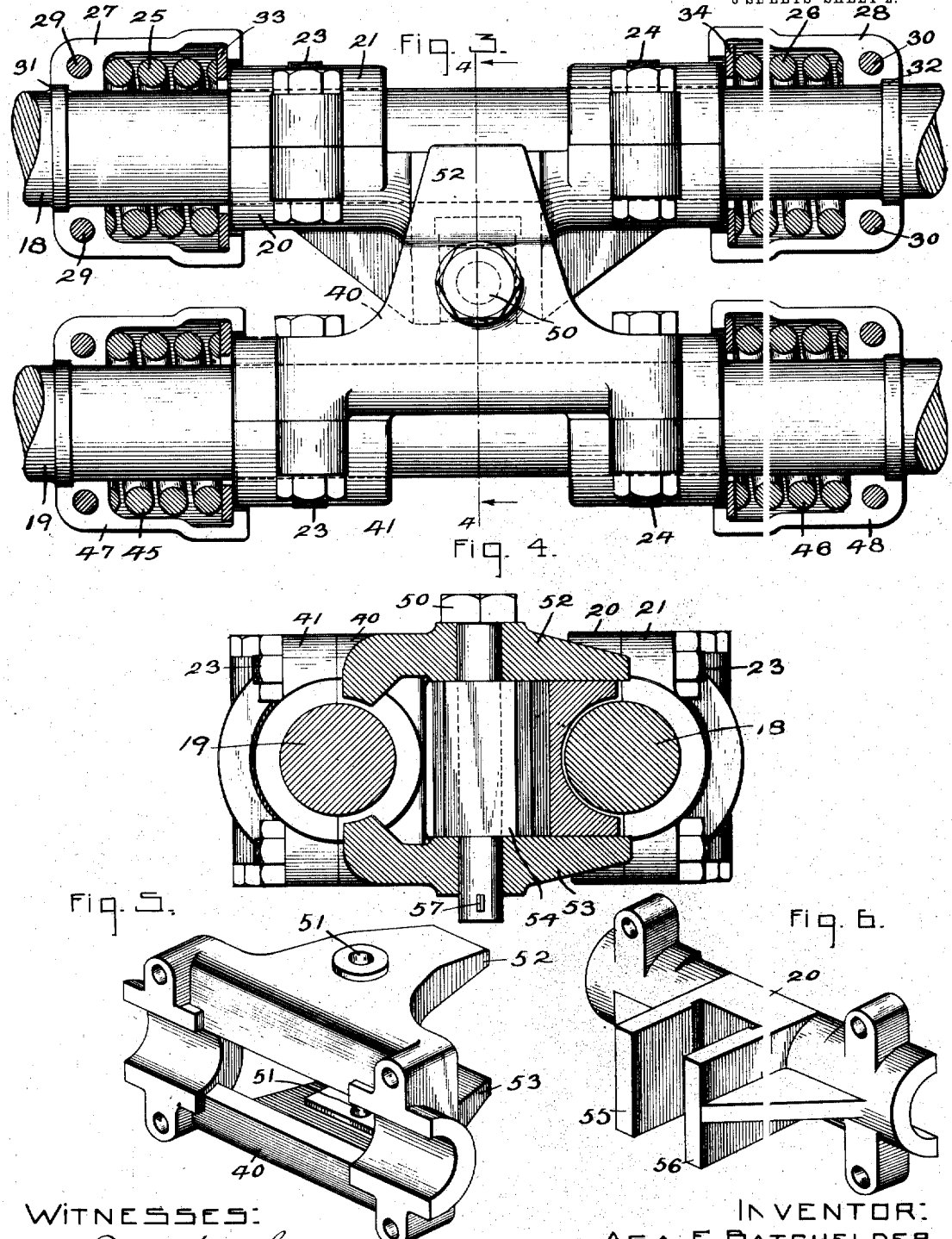

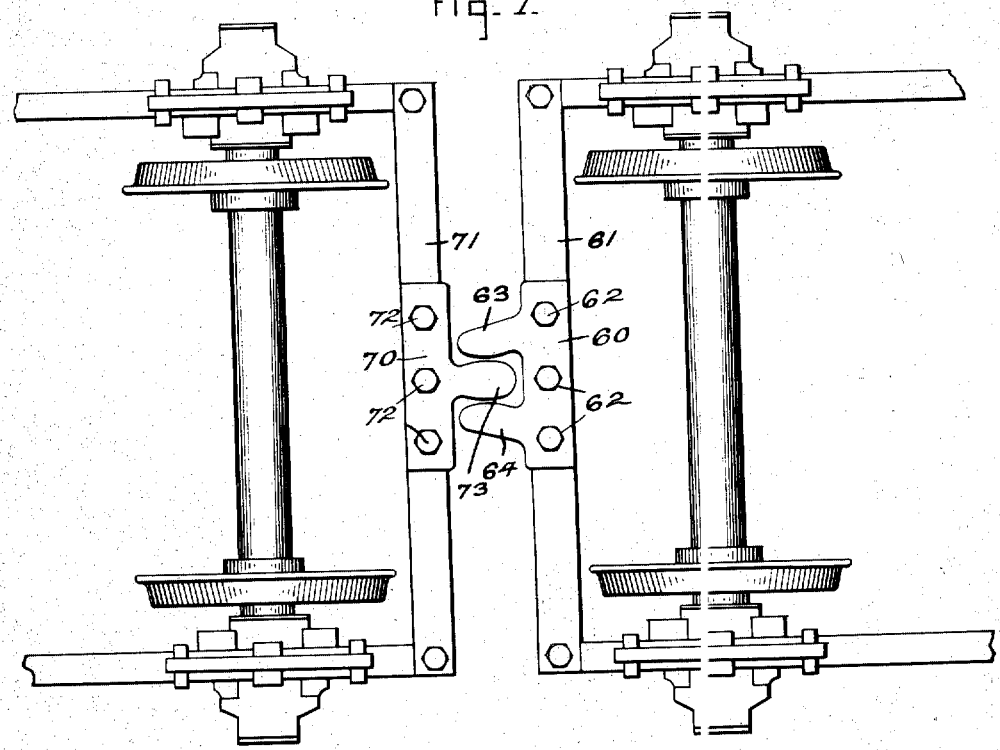
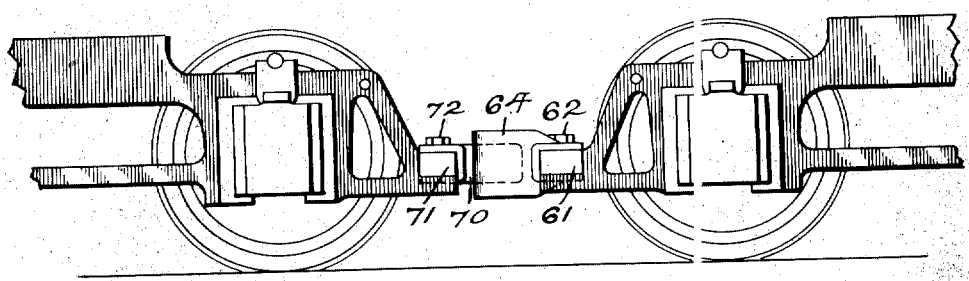

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

LOCOMOTIVE.

1,008,579.     Specification of Letters Patent.     Patented Nov. 14, 1911.

Application filed April 28, 1909. Serial No. 492,743.

*To all whom it may concern:*

Be it known that I, ASA F. BATCHELDER, a citizen of the United States, residing at Schenectady, county of Schenectady, State of New York, have invented certain new and useful Improvements in Locomotives, of which the following is a specification.

My invention relates to locomotives, and particularly to two-truck electric locomotives.

Electric locomotives have been built in which the running gear comprises two trucks, one of which is pivotally connected with the body frame while the other is pivotally and slidingly connected with said frame, the two trucks being connected at their adjacent ends by an articulated joint. In such locomotives the draw-bars are connected to and mounted upon the trucks and the articulated joint serves as a traction connection between the trucks, the body frame of the locomotive transmitting none of the tractive effort. In rounding a curve, one truck simply turns in the body frame while the other truck slides as well as turns with reference to the body frame. In locomotives of this type, it is obviously necessary that the frames of the trucks be made heavy enough to transmit the draw-bar pull, while the body frame of the locomotive can be made comparatively light. Under some conditions it has been found that the heavy draw-bars and the general heavy construction of the trucks has resulted in locating so much of the total weight of the locomotive near the ends thereof that if the vibration, known as "nosing," takes place the hammering on the rails by the leading wheels of the locomotive is great. Two truck locomotives have also been built in which each truck is pivotally connected to the body frame and the draw-bars are connected to the latter, there being no connection between the trucks except the body frame. In such locomotives the tractive effort of each truck is transmitted to the body frame of the locomotive through its pivotal connection with the latter and through the body frame is transmitted to the draw-bars. While such locomotives may be satisfactory under certain conditions, it has been found that under other conditions, particularly when operating at high speed, the vibration of the locomotive from side to side is excessive.

It is an object of my invention to provide a two-truck locomotive which is free from the objections above mentioned.

To the above end, I locate the draw-bars upon the body frame of the locomotive, connect both trucks pivotally to said body frame and insert a guiding connection, but not an articulated joint between the adjacent ends of the trucks. With such an arrangement the tractive effort of each truck is transmitted to the body frame of the locomotive through the pivotal connection between the truck and the body frame and through the body frame is transmitted to the draw-bars. The effect of the guiding connection between the adjacent ends of the trucks is to facilitate the following of the forward truck by the rear truck and to materially steady the locomotive and decrease the tendency to vibrate or "nose."

Besides the general arrangement of parts, I regard the particular forms of guiding connections, hereinafter described, as part of my invention.

Referring to the drawings, Figure 1 shows in side elevation a portion of a two-truck locomotive arranged according to my invention, certain parts being broken away; Fig. 2 is a plan view of the trucks of said locomotive, the brake rigging, driving motors and certain other parts being omitted for the sake of clearness; Fig. 3 is a plan view, partly in section, of the guiding connection shown in Figs. 1 and 2; Fig. 4 is an elevation in cross-section on the line 4—4 of Fig. 3; Figs. 5 and 6 are views in perspective of certain parts of the guiding connection shown in Figs. 1 to 4; and Figs. 7 and 8 are, respectively, a plan and side elevation of the ends of two trucks provided with another simple form of guiding connection.

Referring to Figs. 1 and 2, the body frame of the locomotive is shown at 10, upon which is supported the cab 11. The draw-bars, of which but one, 12, is shown, are connected to the frame 10 in any suitable and well-known manner. In the particular locomotive illustrated, the two trucks are provided with four pairs of wheels, the middle pair of each truck being driven by motors not shown. These trucks, 14 and 15, are each pivotally connected to the body frame 10 of the locomotive in any suitable and well-known manner.

The particular construction shown is well-known and need not be described, since it forms no part of my invention.

The guiding connection between the trucks 14 and 15, shown in Figs. 1 and 2, will be best understood from Figs. 3 to 6, in which its construction is shown in detail. This guiding connection comprises two members which I shall hereinafter refer to as fork and tongue members. The so-called fork member is located upon the end bar 18 of the truck 15, while the tongue member is located upon the end bar 19 of the truck 14; these bars 18 and 19, in the construction shown, being round in cross-section except at their ends where they are made rectangular for convenient attachment to the side frames of the trucks of the locomotive. Referring to Fig. 3, the fork member is shown located upon the shaft 18 and as comprising the parts 20 and 21, of the form shown, which are bolted together about the bar 18 by means of bolts 23 and 24. The parts 20 and 21 when bolted together are slidable upon the bar 18 and are limited in their movement upon said bar by springs 25 and 26 arranged within cups 27 and 28 made in halves and bolted together around the rod 18 by means of bolts 29 and 30. These cups 27 and 28 engage bosses 31 and 32 on the rod 18 and are prevented from movement in one direction by them. Washers 33 and 34 may be used within the cups 27 and 28 to engage with the springs 25 and 26 in a manner clear from the drawing, and against these washers 33 and 34 the ends of the parts 20 and 21 abut. With this arrangement, movement of the parts 20 and 21 longitudinally on the rod 18 in either direction will cause the compression of one of the springs 25 or 26. The tongue member of the guiding connection comprises parts 40 and 41 which are bolted together around the rod 19 by bolts 23 and 24 and are slidable upon said rod in the same manner as the parts 20 and 21 are slidable upon the rod 18. The parts 40 and 41 are arranged between springs 45 and 46 located in cups 47 and 48 secured to the shaft 19 exactly as in the case of the fork member of the guiding connection previously described. The manner in which the fork and tongue members of the guiding connection coöperate will be clear from the drawing. It is sufficient to state that a pin 50 passes through holes 51 in extensions 52 and 53 of the part 40 and carries a bushing 54 which is spanned by extensions or jaws 55 and 56 integral with the part 20. The pin 50 may be held against accidental removal by means of a cotter-pin 57. The bushing 54 being free to slide and revolve between the jaws 55 and 56, the connection between the two trucks is a pivotal and sliding one, or what I have called a guiding connection. It transmits no force longitudinally or vertically from one truck to another but simply insures approximately the same horizontal turning movement of each truck with reference to the locomotive, this guiding effect being cushioned by the springs 25, 26, 45 and 46, as will be clearly understood.

In Figs. 7 and 8, I have shown a very simple form of guiding connection unprovided with any means for cushioning the guiding action of one truck upon another. In this arrangement the fork member is composed of a single piece 60 bolted to the end bar 61 of one of the truck frames by bolts 62, lugs or jaws 63 and 64 being provided on said member 60 and arranged as shown. The tongue member of this guiding connection is shown as made up of a single piece 70 bolted to the end bar 71 of the other truck by bolts 72, the projecting lug 73 being arranged as shown to fit loosely between the jaws 63 and 64 of the fork member. With this arrangement a pivotal and sliding connection is provided between the trucks and guiding of one truck by the other is provided for exactly as with the arrangement shown in Figs. 1 to 6, except that in the present device no cushioning of the guiding action is provided for. Wherever it is unnecessary to provide cushioning in the guiding connection between the trucks, the simple arrangement of Figs 7 and 8 will be satisfactory.

While I have shown certain forms in which my invention may be embodied, I do not wish to limit myself to these, except as called for by the following claims.

What I claim as new and desire to secure by Letters Patent of the United States, is,—

1. In a locomotive, a body frame, draw bars connected thereto, two trucks each pivotally connected to said frame, and a yielding guiding connection between the adjacent ends of said trucks and not on the car body.

2. In a locomotive, a body frame, draw bars connected thereto, two trucks each pivotally connected to said frame, and a guiding connection between the adjacent ends of said trucks comprising a member yieldingly supported on one truck and another member yieldingly supported on the other truck and yieldingly engaging said first-mentioned member.

3. In a locomotive, a body frame, draw bars connected thereto, two trucks each pivotally connected to said frame, and a guiding connection between the adjacent ends of said trucks comprising a fork member yieldingly supported on one truck and a tongue member yieldingly supported on the other truck and yieldingly engaging said fork member.

4. In a locomotive, a body frame, draw bars connected thereto, two trucks each pivotally connected to said frame, and a guiding connection between the adjacent ends of said trucks comprising a fork member on one truck and a tongue member on the other truck, and springs coöperating with said members and arranged to transmit the sliding force exerted by one truck upon the other.

5. In a locomotive, a body frame, draw bars connected thereto, two trucks each pivotally connected to said frame, and a guiding connection between the adjacent ends of said trucks comprising a member slidingly mounted on the end of one truck, a member operating therewith slidingly mounted upon the end of the other truck, and springs located between said members and said trucks for limiting the movement of said members thereon.

6. In a locomotive, a body frame, draw bars connected thereto, two trucks each pivotally connected to said frame, and a guiding connection between the adjacent ends of said trucks comprising a fork member slidingly arranged on the end of one truck and a tongue member slidingly supported on the end of the other truck and slidingly and pivotally coöperating with said forked member and springs limiting the movement of said members on the truck frame.

In witness whereof, I have hereunto set my hand this 24th day of April, 1909.

ASA F. BATCHELDER.

Witnesses:
BENJAMIN B. HULL,
HELEN ORFORD.